3,265,639
PHOSPHONITRILIC POLYMERS

Preston L. Veltman, Severna Park, and Bernard Grushkin, Silver Spring, Md., and Harry H. Sisler, Gainesville, Fla., assignors to W. R. Grace & Co., New York, N.Y., a corporation of Connecticut
No Drawing. Filed Dec. 22, 1961, Ser. No. 161,430
4 Claims. (Cl. 260—2)

The present invention relates to the preparation of inorganic polymers, and more specifically to a stable inorganic polymer which possesses a phosphonitrilic backbone.

In recent years considerable interest has developed in the production of so called inorganic polymers which possess structural skeletons or "backbones" comprised of elements other than carbon. It is often found that inorganic polymers exhibit desirable characteristics such as heat resistance which make them particularly applicable for use in modern technology.

Polymeric phosphonitrilic halides having the general formula

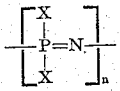

were among first inorganic polymers developed. Such phosphonitrilic halide polymers of high molecular weight are generally linear in structure and are observed to possess elastomeric properties and hence are often termed "inorganic rubbers."

Chemically, the phosphonitrilic halides are known to undergo hydrolysis and ammonolysis reactions due to the reactive nature of the attached halogen atoms. Consequently, while the phosphonitrilic polymers have excellent heat resistance characteristics, in that they do not tend to depolymerize at temperatures much below about 350° C., their tendency to undergo chemical degradation has limited their general usefulness.

It is, therefore, an object of the present invention to provide a novel phosphonitrilic polymer which possesses a superior degree of chemical inertness.

It is an object of the invention to provide a method by which a high molecular weight phosphonitrilic polymer may be produced from inexpensive and readily available raw materials.

A further object of the present invention is to provide a series of novel intermediate compounds from which the presently intended phosphonitrilic polymers may be readily obtained.

These and still further objects of the present invention will become readily apparent to one skilled in the art form the following detailed description and specific examples.

Broadly, the present invention contemplates a novel phosphonitrilic polymer which is believed to possess the repeating structural unit

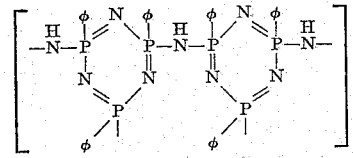

wherein φ represents phenyl radicals. (In the body of the present disclosure the symbol φ will be used to represent the phenyl (C₆H₅—) radical.)

More specifically, the invention involves a high molecular weight phosphonitrilic polymer which is prepared by the following three general steps:

(1) Reacting monophenyl phosphorus tetrahalide (C₆H₅PX₄) with ammonium halide to obtain a cyclic trimeric phenyl substituted phosphonitrilic halide having the formula

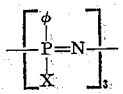

wherein X is chlorine or bromine.

(2) Ammoniating the trimeric phenyl substituted phosphonitrilic halide obtained in step 1 to obtain an ammoniated compound having the formula

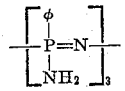

and (3) Polymerizing the ammoniated trimer by heat whereupon a highly crosslinked polymer having the repeating structural unit

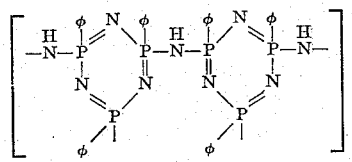

is obtained.

The general reactions involved in obtaining the compounds described in the above steps and the required reaction conditions to bring them about may be set forth as follows:

Step (1) wherein trimeric phenyl phosphonitrilic halide is formed—

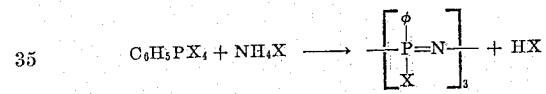

In this step a molar excess of ammonium halide is reacted with monophenyl phosphorus tetrahalide in the presence of an inert solvent at elevated temperatures. Solvents such as chlorobenzene, sym-tetrachloroethane and p-chlorotoluene are suitable. For convenience the temperatures used in this reaction are usually the reflux temperature of the solvent at atmospheric pressure. These temperatures usually range from about 130° C. to about 160° C. As illustrated in the above equation, hydrogen halide gas is evolved during the course of the reaction. When hydrogen halide ceases to evolve from the reaction mixture the reaction has substantially reached completion. At the temperature specified above a reaction period of from about 24 to about 48 hours is normally required for the reaction to substantially reach completion. Subsequent to the completion of the reaction the desired trimeric product is isolated from tetrameric and higher polymeric products, which are produced in some quantity during the reaction, by fractional crystallization from solvents such as cyclohexane. The final trimeric product consists of cis and trans isomers. The trans isomer is a crystalline white solid which possesses a melting point of 156 to 157° C. while the cis isomer has a similar appearance but melts at 185° C. As will be disclosed later in the present description either of these isomers may be used to obtain the presently intended products; however, the polymers obtained from the respective isomers have slightly different properties.

Step (2) wherein the halide of step (1) is ammoniated—

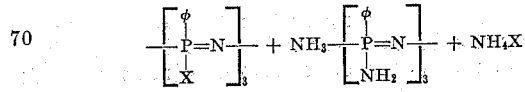

In this part of the process a phenyl phosphonitrilic halide trimer obtained from the previous step is reacted with an excess of ammonia at about room temperature. Preferably the ammoniation is carried out in the presence of an inert solvent such as chloroform. The ammoniation is normally complete as soon as the trimer is added to the ammonia (i.e., immediate) after which the excess ammonia may be removed from the reaction mixture by heating the mixture to reflux. The ammonium halide which precipitates during the reaction may be conveniently removed by filtration. The ammoniated trans isomer possesses a melting point of 207° C. while the ammoniated cis isomer starts to sublime at about 254° C.

Step (3) wherein the ammoniated trimer of step (2) is polymerized—

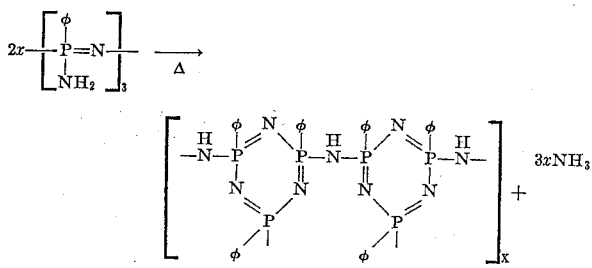

In this step the ammoniated trimers obtained in Step 2 are heated strongly at temperatures of from about 270° to about 300° C. for a period of from about 1 to about 5 hours, during which time ammonia is evolved and a hard, brittle, glass-like polymer is obtained. The heating is preferably carried out in a closed vacuum system so that the ammonia which is evolved may be collected. The polymers obtained in this polymerization step possess melting points in excess of 300° C. and are not hydrolyzed by boiling water. The polymer obtained from the trans trimer is insoluble in all the normal organic solvents, while the polymer obtained from the cis trimer differs in that it is soluble in benzene.

Having described the basic aspects of the present invention, the following specific examples are given to show specific embodiments thereof.

EXAMPLE I

*(1) Preparation of cyclic trimeric phenyl substituted phosphonitrilic chloride*

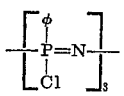

4 moles of $C_6H_5PCl_4$ dissolved in 500 ml. of chlorobenzene was slowly added to 8 moles of ammonium chloride suspended in 4 liters of refluxing chlorobenzene. The mixture was maintained at reflux at 132° C. for 30 hours. At the end of this period 98% of the theoretical HCl was accounted for. After the reaction was completed, the volume of the solution was reduced to about 1.5 liters. Some solid

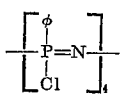

and higher polymers separated from the solution after standing several hours. After removing the tetrameric product the volume of the solution was further reduced to slightly less than one liter. At this time very impure

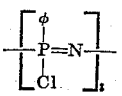

precipitated from the solution upon standing. This trimeric product was recrystallized from cyclohexane until a white crystalline solid, possessing a melting point of 156–157° C. was recovered. A second isomer melting at 185° C. was also recovered during the recrystallization. Dielectric constant measurements on both isomers indicate that the compound melting at 156–157° C. is the trans isomer, i.e. two chlorines on one side of the ring, and the compound that melts at 185° C. is the cis isomer, i.e. three chlorines on one side of the ring.

*(2) Preparation of aminophenyl phosphonitrilic trimer*

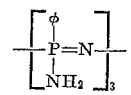

1.7 grams of the trans trimer obtained in (1) above was dissolved in 50 ml. of chloroform. This solution was added dropwise to 100 ml. of chloroform saturated with ammonia. The reaction mixture was held at room temperature for about 30 minutes after which excess ammonia was removed by refluxing the chloroform solution. Ammonium chloride, which precipitated during the reaction, was filtered off while the solution was hot. 0.569 g. of ammonium chloride was recovered which represents the theoretical amount which should be obtained for a completely ammoniated product. The ammoniated trimer was isolated from the reaction solution as chloroform adduct

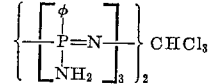

by slow evaporation of the chloroform. Chloroform was removed from the adduct by heating the adduct to 150° C. under 0.5 mm. Hg pressure. The elemental analysis and IR spectrum agree to confirm that the product has a formula

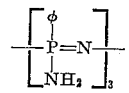

The melting point of the product was 207° C.

*(3) Preparation of the high molecular weight phosphonitrilic polymer*

0.2893 g. of the ammoniated trimer obtained above was heated to 300° C. under a vacuum of $10^{-3}$ mm. Hg pressure for a period of two hours. Ammonia which evolved was collected in a liquid nitrogen trap. During the heating the sample lost 0.0217 g. of ammonia. The calculated theoretical loss for a reaction would be 0.0238 g. if complete crosslinking occurred and the following product was obtained:

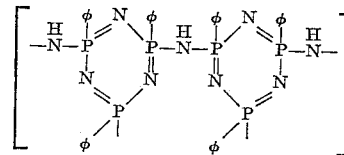

An elemental analysis of the final polymeric product indicated that there are 1.5 nitrogens for each phosphorus. This analysis is in agreement with the structure shown above. This product was a brittle, colorless, transparent glass that was insoluble in water, chloroform, acetone, carbon tetrachloride, benzene, chlorobenzene, and bromobenzene at their boiling points. The polymer showed no birefringence on the polarizing microscope, and started to melt at approximately 325° C.

EXAMPLE II

The sample cis isomer obtained in Example I was ammoniated by a process similar to that given in Example I, by dissolving 0.5433 g. of

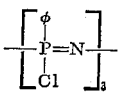

having a melting point of 185° C. in 50 ml. of chloroform and slowly adding this solution to chloroform which had been saturated with ammonia. A white solid that started to sublime at 254° C. and started to decompose at 264° C. was obtained. Elemental analysis of the compound indicated that the compound had the probable structure

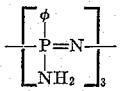

0.1 g. of this trimer was heated to 300° C. under vacuum. Ammonia was evolved and the final reaction product was a yellow brittle glass that was soluble in benzene.

The above specific examples clearly indicate that a stable high molecular weight phosphonitrilic polymer may be obtained in accordance with the process set forth herein.

We claim:

1. A highly crosslinked phosphonitrilic polymer which possesses the repeating structural unit

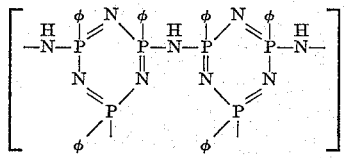

wherein φ represents phenyl.

2. A method for preparing the phosphonitrilic polymer of claim 1 which comprises heating a cyclic compound of the formula

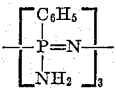

to a temperature of from about 270° C. to below the decompositon temperature thereof for a time sufficient to cause the evolution of ammonia therefrom.

3. A method for preparing a high molecular weight polymer having the repeating structural unit

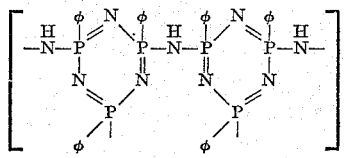

wherein φ represents phenyl which comprises heating a cyclic compound of the formula

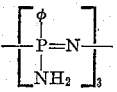

to a temperature of from about 270° C. to about 300° C. for a period of from about 1 to about 5 hours.

4. The cyclic compound

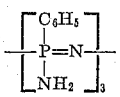

References Cited by the Examiner

UNITED STATES PATENTS 3,048,631   8/1962   Audruth et al. _____ 260—2

FOREIGN PATENTS 1,267,527   6/1961   France.
1,039,747   9/1958   Germany.

OTHER REFERENCES

Bode et al.: "Chemische Berichte," vol. 75, 1942, pages 215–26.

Dishon et al.: "Jour. Polymer Science," vol. 4, 1949, pp. 75–82.

Shaw: "Chemistry and Industry," Mar. 28, 1959, pages 412–416.

Becke-Goehring et al.: "Zeitschrift für Anorg. und Allgemeine Chemie," vol. 304, 1960, pages 126–136.

Moeller et al.: "Chemistry and Industry," Feb. 24, 1962, pages 361–2.

Humiec et al.: "Jour. Am. Chem. Soc.," vol. 83, May 5, 1961, pages 2210–1.

Herring: "Chemistry and Industry," June 18, 1960, pages 717–8.

Shaw et al.: "Jour. Chem. Soc.," 1962, pages 5004–9.

Shaw: "Jour. Polymer Science," vol. 50, pages 21–30, March 1961.

Shaw et al.: Chemistry and Industry (London), January 1959, pages 52–53.

SAMUEL H. BLECH, *Primary Examiner.*

LOUISE P. QUAST, MURRAY TILLMAN, *Examiners.*

P. H. HELLER, *Assistant Examiner.*